United States Patent Office 2,822,402
Patented Feb. 4, 1958

2,822,402

PREPARATION OF 1,1-DIMETHOXYCYCLO-HEXANE

Robert E. McCoy, Sanford, Mich., assignor to The Dow Chemical Company, Midland, Mich., a corporation of Delaware No Drawing. Application February 6, 1956
Serial No. 563,441

4 Claims. (Cl. 260—611)

This invention relates to a method for the preparation of 1,1-dimethoxycyclohexane, also known as cyclohexanone dimethylacetal.

This acetal is useful as a perfume base, and is also useful as a dehydrating agent for hydrocarbon fuels such as gasoline and fuel oil. The known methods for the preparation of cyclohexanone dimethylacetal are unsatisfactory for commercial preparation of the compound, since they require such reagents as methyl orthosilicate or methyl sulfite. A simpler and more economical procedure is desired, and it is the object of this invention to provide such an improved procedure.

The method of the present invention is surprisingly simple, in view of the widespread belief that simple acetals of ketones, unlike those of aldehydes, cannot usually be made by direct reaction between alcohols and ketones.

According to the present invention, cyclohexanone is mixed with methanol, the latter being preferably in excess, and the mixture is allowed to stand, preferably in contact with an acid catalyst, at a temperature in the range from 0° C. to the boiling point of the mixture (near 65° C.). The reaction period varies from a few minutes when an acid catalyst is employed to several hours in the case of uncatalysed or low temperature reactions. After a suitable reaction period, the mixture is neutralized or made slightly alkaline, preferably with an anhydrous alkali, and the acetal is recovered by fractional distillation.

Typical of the numerous acid catalysts which may be employed are aqueous or methanolic or dry hydrogen chloride, concentrated sulfuric acid, phosphoric anhydride, acid clays, the acid (H+) form of ion exchange resins, and other organic or inorganic acids and their anhydrides. The acid catalyst can be neutralized with such diverse basic materials as ammonia, sodium hydroxide, sodium methoxide, and methylamine, either aqueous or anhydrous.

The reaction may be carried to higher conversions if an inert desiccating agent, such as anhydrous copper or magnesium sulfate, or silica gel, is present in the reaction medium, but it is not essential to have a drying agent present.

In a specific example, a mixture of 1 liter of cyclohexanone (about 9.7 mols) and 1 liter of methanol (about 24.7 mols) and a few drops of 9 molar hydrogen chloride in methanol was allowed to stand overnight in a stoppered bottle. The hydrogen chloride was then neutralized by adding methanolic sodium methoxide in amount sufficient to bring the mixture to pH8. The mixture was subjected to fractional distillation at 50 millimeters pressure. After a second fractionation, there was obtained substantially pure 1,1-dimethoxycyclohexane having a refractive index of 1.4372 at 25° C., and a boiling point of 73° C. at 50 millimeters. The recovered methanol, amounting to about 18 mols, and the recovered cyclohexanone, about 6.3 mols, could both be used for further reaction, and the 3.3 mols of 1,1-dimethoxycyclohexane represented nearly a perfect yield based on the unrecovered reagents. The identity of the product was confirmed both by the properties noted above and by mass spectrum analysis.

While the conversion to the acetal was only about 36 percent in the run reported above, the substantially complete recovery of raw materials and the nearly theoretical yield make the process economically feasible. When the same procedure is repeated in the presence of a desiccating agent, the conversion is increased to over 50 percent, and a quantitative yield of the acetal is obtained.

The various acid catalysts have been found to be of equivalent effect, and the several basic agents used to neutralize the catalyst after the reaction appear to be equivalents for that purpose. No monohydric alcohol has been found, however, which reacts with cyclohexanone in the described manner other than methanol.

I claim:

1. The method which comprises subjecting cyclohexanone to the action of an excess of methanol in the presence of an acid catalyst, at a temperature from 0° C. to about 65° C., thereafter rendering the mixture non-acidic, and fractionally distilling the mixture to recover 1,1-dimethoxycyclohexane the cyclohexanone and methanol being the sole reagents and the acid being the sole catalyst employed.

2. The method claimed in claim 1, wherein the reaction is effected at temperatures from room temperature to about 40° C.

3. The method claimed in claim 1, wherein the catalyst is hydrogen chloride.

4. The method claimed in claim 1, wherein there is present during the reaction a desiccating agent inert to the reagents.

References Cited in the file of this patent

Helferich et al.: Chem. Abstracts, (1924), vol. 18, p. 2869.